US010258905B2

(12) United States Patent
Bowers et al.

(10) Patent No.: US 10,258,905 B2
(45) Date of Patent: Apr. 16, 2019

(54) MONITORING AND CONTROLLING HYDROCYCLONES USING VIBRATION DATA

(71) Applicant: Emerson Electric (US) Holding Corporation (Chile) Limitada, Santiago (CL)

(72) Inventors: Stewart V. Bowers, Knoxville, TN (US); Timothy Scott Bassett, Knoxville, TN (US); Tuhin Banerjee, Ontario (CA); Michael Schaffer, Ontario (CA); Daniel Nower, Knoxville, TN (US)

(73) Assignee: Emerson Electric (US) Holding Corporation (Chile) Limitada (CL)

( * ) Notice: Subject to any disclaimer, the term of this patent is extended or adjusted under 35 U.S.C. 154(b) by 0 days.

(21) Appl. No.: 15/516,103

(22) PCT Filed: Oct. 2, 2015

(86) PCT No.: PCT/IB2015/002104
§ 371 (c)(1),
(2) Date: Mar. 31, 2017

(87) PCT Pub. No.: WO2016/051275
PCT Pub. Date: Apr. 7, 2016

(65) Prior Publication Data
US 2017/0239594 A1 Aug. 24, 2017

Related U.S. Application Data

(60) Provisional application No. 62/058,854, filed on Oct. 2, 2014.

(51) Int. Cl.
*B01D 21/26* (2006.01)
*B01D 21/34* (2006.01)
(Continued)

(52) U.S. Cl.
CPC .......... *B01D 21/34* (2013.01); *B01D 21/267* (2013.01); *B04C 11/00* (2013.01); *G01H 1/00* (2013.01)

(58) Field of Classification Search
None
See application file for complete search history.

(56) References Cited

U.S. PATENT DOCUMENTS

| 4,441,960 A * | 4/1984 | Karnis .................. D21F 1/0009 162/263 |
| 6,601,005 B1 | 7/2003 | Eryurek et al. |

(Continued)

FOREIGN PATENT DOCUMENTS

WO 9107231 5/1991

OTHER PUBLICATIONS

Fengxia Lv. Zunce Wang et al, Text and Analysis of Vibration characteristic of New Type Dynamic Hydrocyclone ; paper No. OMAE@)!)_21069, pp. 629-635, 2010 (abstract only).*

(Continued)

*Primary Examiner* — Ana M Fortuna
(74) *Attorney, Agent, or Firm* — Laudeka Neely Group, P.C.

(57) ABSTRACT

A hydrocyclone vibration measurement system includes an upper vibration sensor attached to the overflow of a hydrocyclone and a lower vibration sensor attached to the underflow of the hydrocyclone. A vibration analysis system includes an ADC, an overall vibration value processing channel, and one or more band pass filters. The overall vibration value processing channel generates overflow and underflow scalar vibration values representing overall vibration measured at the overflow and underflow portions of the hydrocyclone. The vibration analysis system may interface with a DCS to provide control information for controlling (Continued)

the hydrocyclone based on the overflow and underflow scalar vibration values.

29 Claims, 8 Drawing Sheets

(51) Int. Cl.
*B04C 11/00* (2006.01)
*G01H 1/00* (2006.01)

(56) References Cited

U.S. PATENT DOCUMENTS

| | | | |
|---|---|---|---|
| 6,874,364 | B1 | 4/2005 | Campbell et al. |
| 6,983,850 | B2 | 1/2006 | Olson et al. |
| 7,430,914 | B2* | 10/2008 | Mitchell ................ G01M 7/08 73/579 |
| 2005/0072239 | A1 | 4/2005 | Longsdort et al. |
| 2007/0062291 | A1* | 3/2007 | Mitchell ................ G01M 7/08 73/649 |
| 2008/0082296 | A1* | 4/2008 | Robinson ................ G01H 1/00 702/182 |
| 2013/0220938 | A1 | 8/2013 | Castro |
| 2014/0067289 | A1 | 3/2014 | Baldwin |
| 2014/0151274 | A1* | 6/2014 | Hadfield ................ B04C 11/00 210/85 |
| 2014/0324389 | A1* | 10/2014 | Baldwin ................ G01D 9/005 702/187 |
| 2017/0239594 | A1* | 8/2017 | Bowers ................ B01D 21/34 |

OTHER PUBLICATIONS

International Search Report and Written Opinion for PCT/IB 15/02104, dated Mar. 17, 2016, 15 pages.
Russell, Jerin, et al., Hydrocyclone classification optimization using real-time coarse particles detection in the overflow stream, Presented at 2013 Procemin Conference, Accessed from http://www.cidra.com/resource-center/hydrocyclone-classification-optimization-using-real-time-coarse.
Cyclones Resource Book, Accessed from http://rsteyn.files.wordpress.com/2010/07/cyclones-basics.pdf.
FLSmidth, Krebs SmartCyclone™, Accessed from http://www.fismidth.com/~/media/PDF%20Files/Liquid-Solid%20Separation/Hydrocyclones/04206SmartCycloneSpecificationSheet.ashx.
Wills, Barry A., et al., Mineral Processing Technology, An Introduction to the Practical Aspects of Ore Treatment and Mineral Recovery, ISBN: 0750644508, Elsevier Science & Technology Books, Oct. 2006, pp. 171, 176, 212-223.

* cited by examiner

MONITORING AND CONTROLLING HYDROCYCLONES USING VIBRATION DATA

FIELD

This invention relates to monitoring and control of mining equipment. More particularly, this invention relates to a system for monitoring vibration of hydrocyclones and controlling operation of the hydrocyclones based on vibration information.

BACKGROUND

Hydrocyclones are used in mining processes to separate two streams of material into overflow and underflow streams. Many process variables must be controlled to create a dynamic condition for excellent separation. It is not unusual for roping, plugging, or other undesirable conditions to occur due to materials or speeds or other conditions.

Classification is a critical component of any minerals milling circuit. Hydrocyclones efficiently separate mill discharge, returning coarse material to the mill and sending fine materials to downstream processing, such as flotation. Due to process abnormalities, hydrocyclones may plug or develop an underflow condition referred to as "roping." Whenever a hydrocyclone is roping or plugged, large amounts of coarse, misplaced material may end up in hydrocyclone overflow and downstream float cells. Once roping occurs, the separation process becomes unsatisfactory. When plugging occurs, the process stops altogether, requiring excessive manpower to clean out and restart the process.

In prior systems, operators had no indication of roping before the problem occurred. To determine which of many hydrocyclones may be roping, an operator had to climb to the top of a group of hydrocyclone units (also referred to herein as a "pack" of hydrocyclones) to see which unit was not operating properly.

One attempt to address the roping detection problem involves attaching ultrasonic sensors to an underflow portion of the hydrocyclone. As the underflow approaches roping, the underflow hits progressively lower on the hydrocyclone splash skirt and eventually misses the splash skirt altogether. The corresponding changes in ultrasonic signal strength are processed to aid in recognition of roping and to generate an alarm when roping occurs. Unfortunately, ultrasonic energy in the 40 kHz frequency range is substantially attenuated by elastomeric liner materials, interfaces, gaps and boundaries, and distance, all of which are present in hydrocyclone applications. Furthermore, all of these attenuation conditions can change from time to time during normal operation.

What is needed, therefore, is a reliable method to detect the onset of roping, plugging, and other adverse conditions and to immediately notify the control room as to which hydrocyclone unit is experiencing a problem. In particular, a detection method is needed for monitoring both the overflow and the underflow conditions of a hydrocyclone using vibration analysis. The desired method performs vibration analysis in sonic frequency ranges, as opposed to the ultrasonic frequency ranges of previous applications.

SUMMARY

The above and other needs are met by a hydrocyclone vibration measurement system that includes a set of upper vibration sensors, a set of lower vibration sensors, and a vibration analysis system. In a preferred embodiment, the set of upper vibration sensors include at least one vibration sensor attached to an overflow portion of each hydrocyclone in a hydrocyclone pack. The upper vibration sensors generate a plurality of analog overflow vibration signals. The set of lower vibration sensors include at least one vibration sensor attached to an underflow portion of each of the hydrocyclones in the hydrocyclone pack. The lower vibration sensors generate a plurality of analog underflow vibration signals.

The vibration analysis system includes an analog-to-digital converter and one or more overall vibration processing channels. The analog-to-digital converter samples the analog overflow vibration signals and underflow vibration signals at a fixed sampling rate and converts the analog overflow and underflow vibration signals into digital overflow and underflow vibration signals. The one or more overall vibration processing channels process the digital overflow and underflow vibration signals to generate overflow and underflow scalar vibration values representing overall vibration measured at the overflow and underflow portions of the hydrocyclones in the hydrocyclone pack.

In some embodiments, one or more band pass filters are provided to band pass filter the digital overflow and underflow vibration signals to generate band pass limited digital overflow and underflow vibration signals.

In some embodiments, the vibration analysis system is operable to interface with a distributed control system to provide control information to the distributed control system based at least in part on the overflow and underflow scalar vibration values.

In some embodiments, the upper vibration sensors are disposed such that a sensing axis of each upper vibration sensor is substantially perpendicular to a central flow axis of the hydrocyclone to which it is attached, and the lower vibration sensors are disposed such that a sensing axis of each lower vibration sensor is substantially perpendicular to the central flow axis of the hydrocyclone to which it is attached.

In some embodiments, the vibration analysis system includes a comparison module that compares one or more of:
  the overflow scalar vibration values measured during a first time period to the underflow scalar vibration values measured during the first time period;
  the overflow scalar vibration values measured during the first time period to the overflow scalar vibration values measured during a second time period that is different from the first time period;
  the underflow scalar vibration values measured during the first time period to the underflow scalar vibration values measured during the second time period;
  the overflow scalar vibration values measured during the first time period to baseline overflow scalar vibration values measured during a time period when one or more of the hydrocyclones were operating in a normal condition; and
  the underflow scalar vibration values measured during the first time period to baseline underflow scalar vibration values measured during the time period when one or more of the hydrocyclones were operating in a normal condition.

Based on one or more of these comparisons, the comparison module generates control information that may be used in initiating control or making decisions about control of the hydrocyclone.

In some embodiments, the comparison module compares the overflow scalar vibration values in a frequency range of 0 kHz to 4 kHz measured during the first time period to baseline overflow scalar vibration values in the same frequency range measured during a time period when one or more of the hydrocyclones were operating in a normal condition.

In some embodiments, the comparison module generates control information for controlling operation of the hydrocyclone when energy levels of the overflow scalar vibration values in the frequency range of 0 kHz to 4 kHz measured during the first time period are higher than energy levels of the baseline overflow scalar vibration values in the same frequency range measured during a time period when one or more of the hydrocyclones were operating in a normal condition. The control information may comprise an alert message that informs an operator regarding a roping condition that may be occurring in the underflow from one or more of the hydrocyclones, or the control information may comprise a control signal that initiates a shutdown of one or more of the hydrocyclones.

In some embodiments, the comparison module compares the underflow scalar vibration values in a frequency range of 0.5 kHz to 2.5 kHz measured during the first time period to baseline underflow scalar vibration values in the same frequency range measured during a time period when one or more of the hydrocyclones were operating in a normal condition.

In some embodiments, the comparison module generates control information for controlling one or more of the hydrocyclones when energy levels of the underflow scalar vibration values in the frequency range of 0.5 kHz to 2.5 kHz measured during the first time period are higher than energy levels of the baseline underflow scalar vibration values in the same frequency range measured during a time period when one or more of the hydrocyclones were operating in a normal condition. The control information may comprise an alert message that informs an operator regarding a roping condition that may be occurring in the underflow from one or more of the hydrocyclones, or the control information comprises a control signal that initiates a shutdown of one or more of the hydrocyclones.

In some embodiments, the comparison module generates control information for controlling operation of one or more of the hydrocyclones when energy levels of the underflow scalar vibration values measured during the first time period are less than energy levels of the overflow scalar vibration values measured during the first time period, or energy levels of the underflow scalar vibration values measured during the second time period which occurs after the first time period are greater than energy levels of the overflow scalar vibration values measured during the second time period.

Such a transition of the energy levels of the underflow scalar vibration values from less than to greater than the energy levels of the overflow scalar vibration values may indicate a plugged condition of one or more of the hydrocyclones. The control information may comprise an alert message that informs an operator regarding the plugged condition of one or more of the hydrocyclones, or the control information may comprise a control signal that initiates a shutdown of one or more of the hydrocyclones.

In another aspect, the invention provides a method for measuring and analyzing vibration associated with a hydrocyclone. A preferred embodiment of the method includes the following steps:

(a) sensing vibration associated with an overflow portion of the hydrocyclone using an upper vibration sensor attached to the overflow portion;

(b) the upper vibration sensor generating an analog overflow vibration signal indicative of the vibration sensed in step (a);

(c) sensing vibration associated with an underflow portion of the hydrocyclone using a lower vibration sensor attached to the underflow portion;

(d) the lower vibration sensor generating an analog underflow vibration signal indicative of the vibration sensed in step (c);

(e) sampling the analog overflow vibration signal and underflow vibration signal at a fixed sampling rate and converting the analog overflow and underflow vibration signals into digital overflow and underflow vibration signals; and (f) processing the digital overflow and underflow vibration signals to generate overflow and underflow scalar vibration values representing overall vibration measured at the overflow and underflow portions of the hydrocyclone.

In some embodiments, the method includes providing control information to a distributed control system based at least in part on the overflow and underflow scalar vibration values.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIGS. 5A, 5B and 5C depict vibration waveforms indicating the presence and absence of roping in the underflow of a hydrocyclone;

DETAILED DESCRIPTION

Figure 1:
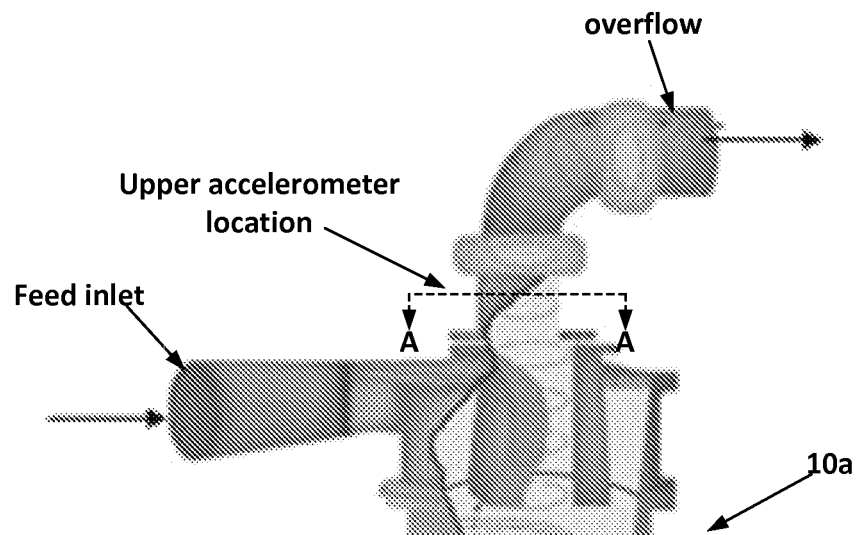
FIG. 1 depicts a cutaway view of a hydrocyclone.
Figure 1:
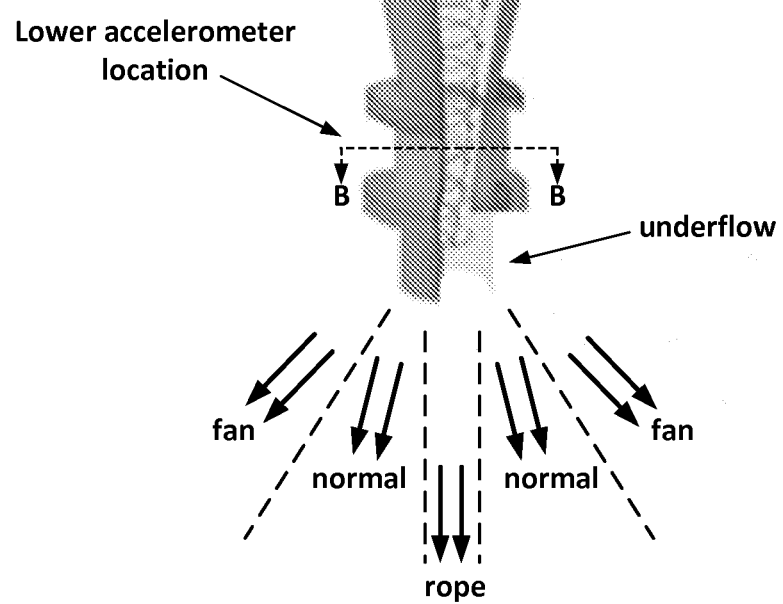

FIG. 1 depicts an exemplary hydrocyclone unit 10, which may also be referred to herein as a cyclone. When the unit 10 is operating properly, the exiting slurry is dispersed from an underflow portion of the hydrocyclone in a cone shaped pattern as depicted within the "normal" region of the underflow end. When roping, occurs the exiting slurry in the underflow streams out in a tight pipe-shape flow pattern, which is shown in FIG. 1 as the "rope" region.

Figure 2A:
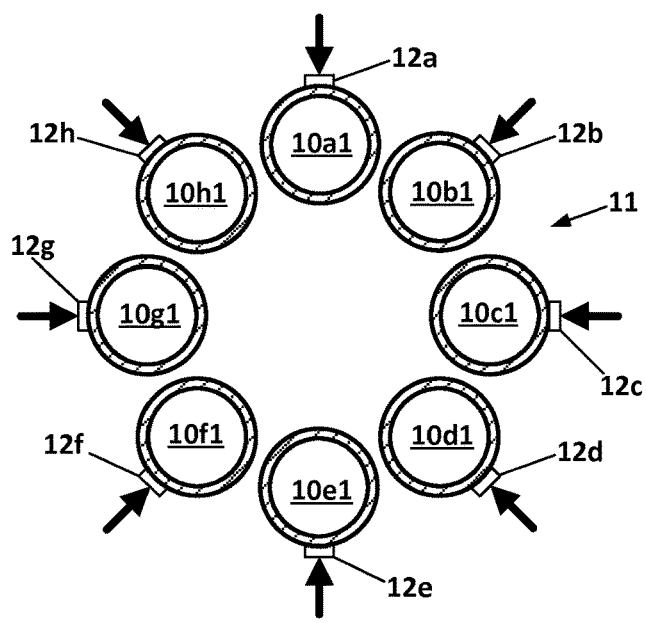
FIGS. 2A and 2B depict placement of sensors on a pack of hydrocyclones according to a preferred embodiment.

FIG. 2A depicts a cross section view of pipe flange sections of the overflow portions 10$a$1-10$h$1 of eight hydrocyclones 10$a$-10$h$ in a hydrocyclone pack 11. An accelerometer 12a-12h is attached to each of the overflow portions 10a1-10h1. The eight accelerometers 12a-12h are referred to herein as the upper set of accelerometers.

Figure 2B:
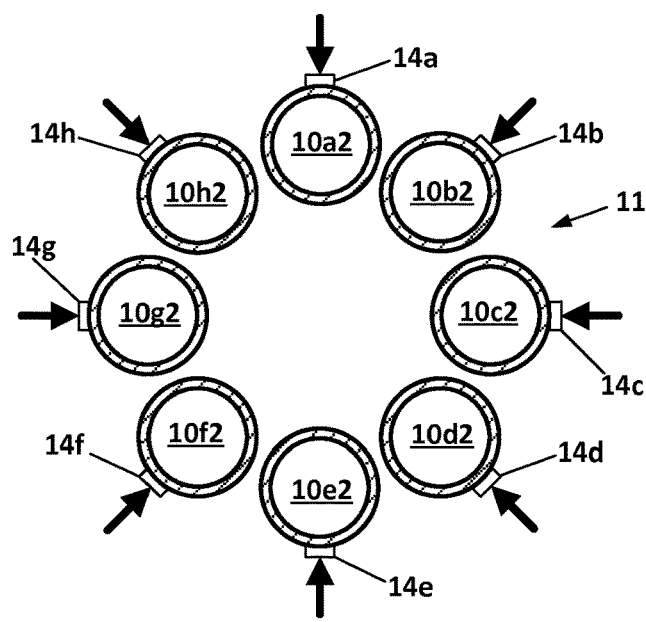

FIG. 2B depicts a cross section view of pipe flange sections of the underflow portions 10a2-10h2 of the same eight hydrocyclones 10a-10h in the hydrocyclone pack 11. An accelerometer 14a-14h is attached to each of the underflow portions 10a2-10h2. The eight accelerometers 14a-14h are referred to herein as the lower set of accelerometers.

As shown in FIGS. 2A and 2B, the eight accelerometers in each set are spaced apart around the pack at an equal spacing of approximately 45 degrees. It will be appreciated that although the exemplary embodiment includes eight underflow accelerometers and eight overflow accelerometers, other numbers of accelerometers could be used, and other radial spacings could be implemented depending on the number of hydrocyclones in the pack. Thus, the invention is not limited by the number or angular placement of accelerometers.

In a preferred embodiment, the sensor mounting pads are welded to the hydrocyclone flanges so that when the accelerometers are mounted, they all measure radial vibration. This orientation is preferably the same for the underflow and overflow mounting locations on each hydrocyclone. Thus, the sensing axis of each accelerometer is preferably disposed perpendicular to the surface of the cylindrical flange section of the hydrocyclone as indicated by the arrows.

Figure 3:
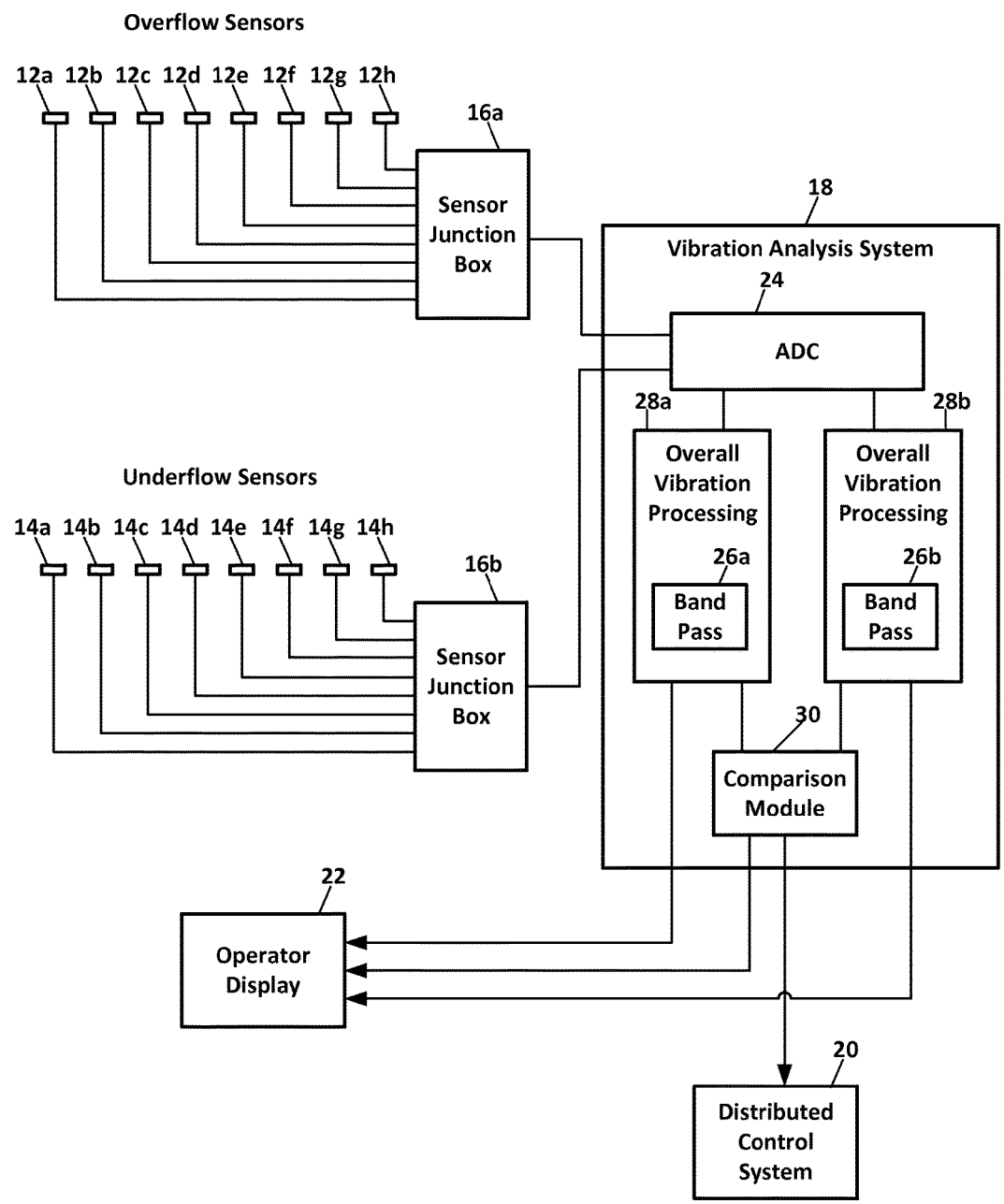
FIG. 3 depicts a vibration sensing and analysis system according to a preferred embodiment.

As shown in FIG. 3, the accelerometers 12a-12h and 14a-14h are connected through junction boxes 16a-16b to a vibration analysis system 18, such as a CSI Model 6500, which is interfaced with a distributed control system (DCS) 20 and an operator display device 22.

The vibration analysis system 18 includes an analog-to-digital converter (ADC) 24 that over-samples the vibration signals from the two sets of accelerometers, such as at 50.2 kHz, 104.4 kHz or 204.8 kHz, to generate digital vibration data. In a preferred embodiment, the digital vibration data from each accelerometer is processed in a separate parallel processing channel of the vibration analysis system 18. To simplify FIG. 3, only two processing channels are depicted—one for processing data from the upper (overflow) accelerometers and one for processing data from the lower (underflow) accelerometers.

In the overflow processing channel, an overall vibration processor 28a generates overall vibration scalar values indicating overall vibration energy sensed by the overflow accelerometers. For some data analysis and plotting operations, a band pass filter 26a filters the overall overflow vibration data to generate band pass limited data in the 0-4 kHz band. In the underflow processing channel, an overall vibration processor 28b generates overall vibration scalar values indicating overall vibration energy sensed by the underflow accelerometers. For some data analysis and plotting operations, a band pass filter 26b filters the overall underflow vibration data to generate band pass limited data in the 500-2500 Hz band.

While the 0-4 kHz and 500-2500 Hz frequency bands have been determined to be appropriate for the hydrocyclone pack examples described herein, other hydrocyclone packs may exhibit vibration energy in slightly different frequency ranges due to structural make-up, configuration, and the materials being processed. Thus, one skilled in the art will appreciate that inventions described herein are not limited to any particular embodiment involving any particular frequency ranges of interest.

The overall vibration values at the output of the overall vibration processors 28a and 28b may be converted to frequency spectrums based on Fast Fourier Transform (FFT) processing for plotting on the operator display 22. Alternatively, the overall vibration values may be plotted in time domain format on the display 22.

In a preferred embodiment, the vibration data at the output of the overall vibration processors 28a and 28b are provided to comparison module 30 that includes logic for comparing scalar vibration energy levels from the upper and lower sets of accelerometers to detect detrimental conditions, such as roping and plugging. In a preferred embodiment, control signals from the comparison module 30 are provided to the distributed control system 20 for use in controlling the operation of the hydrocyclone, as described in more detail hereinafter.

In some embodiments, the comparison module 30 compares baseline and historical vibration levels and compares vibration signals from the upper and lower accelerometer sets at the same and at different times to make decisions about the control of the processing conditions for hydrocyclone operations. Analysis of the vibration data provides information that adds insight and value to a plurality of process measurements coming from other sources. The vibration data is preferably combined with interdependent process inputs to define a reliable process control for hydrocyclones used in mining operations.

In some embodiments, selective decimation of the oversampled data provides significant information about material movements inside the hydrocyclone pack. In a preferred embodiment, the vibration analysis system 18 executes software for analyzing the oversampled data using methods described in U.S. Patent Publication No. 2014/0324367, entitled "Selective Decimation and Analysis of Oversampled Data," ("the '367 Publication") which is incorporated herein in its entirety by reference. The selective decimation methods are preferably applied to discern and characterize conditions within the hydrocyclones, including roping and plugging and precursors of those and other hydrocyclone processing conditions.

In some embodiments, selective decimation is implemented in the vibration analysis system 18 by collecting oversampled data, such as at a 50.2 kHz, 104.4 kHz or 204.8 kHz sampling rate for a block of time, such as for 10 seconds or 100 seconds or some other regular oversampled interval. The entire data block is analyzed as a sampling interval using the methods disclosed in the '367 Publication. Frequency analysis of information within each sampling interval preferably focuses on resonant frequencies of the hydrocyclone structure to detect changes in amplitude and to detect modulation as the process vortexes add and subtract and line up with those natural resonant frequencies.

In some embodiments, software executed by the vibration analysis system 18 analyzes selective decimation statistics for all or a portion of the sampling intervals. Attribute analysis of data within sampling intervals is particularly helpful for distinguishing between operating states and process changes. Such attribute analysis methods and methods for diagnosing material movement in a process by selective decimation are disclosed in the '367 Publication.

In some embodiments, a bump test is used to determine one or multiple resonant structural features in the vicinity of the overflow accelerometers 12a-12h and the underflow accelerometers 14a-14h for a given hydrocyclone. A bump test is a preferred technique because it is typically conducted using negative linear averaging such that when a series of impacts (such as twelve) is performed, the enormous amount of vibration energy from most other sources, such as process materials moving through the operating hydrocyclone, is subtracted leaving only the signature of the resonant response to the bump test impacts. Based on the resonant frequencies, damping and response information, the vibration analysis system 18 provides information to an operator about where to expect highest, lowest and intermediate multiplication of vibration frequency information detected by the accelerometers. Such information may be provided as a scalar value via a Modbus interface.

Table 1 below sets forth process characteristics and related physical responses, along with expected sensor responses and lag times.

TABLE 1

| Process Characteristics | Physical Response/Effects | Sensor Response | Lag Time |
|---|---|---|---|
| Normal separation | Ideal operating conditions. Constant operating pressure, with pressure at baseline level, Physical responses include: "ideal" cone angle at cyclone underflow; cyclone over-flow density and cut-point at target levels. | Uniform vibration readings at baseline level. | This is an operating state. Sensor response should track operating conditions. |
| Approaching Roping | Underflow starts to miss splash skirt, with pressure above baseline level, Physical responses include: decreasing cone angle at cyclone underflow; cyclone over-flow density and cut-point increasing. | Higher variability in vibration readings, with readings trending lower than baseline level, | This is an operating state. Sensor response should track operating conditions. |
| Roping | Underflow looks cylindrical, having same diameter as the hydrocyclone spigot. Physical responses include: loss of vortex; constant pressure at "high" level; high underflow density and cut-point. | Uniform vibration reading below the baseline level value. | This is an operating state. Sensor response should track operating conditions. |
| Flow-Rate Increase—Good | Within limits, increase in flow-rate should result in better separation. With all other factors held steady, an increase in flow results in an increase in pressure. Physical responses include: reduced cut-point; cone angle resembling "ideal" shape. | Uniform vibration readings approaching baseline level. | 30 Seconds |
| Flow-Rate Increase—Bad | Increasing the flow to the point of overloading the cyclone operating range results in poor separation, and can lead to roping. Physical responses include: reduction in cone angle at cyclone underflow; increased cut-point, | High variability in vibration readings. Readings trending lower than baseline level at cyclone underflow. Readings trending higher than baseline level at cyclone overflow. | 30 Seconds |
| Flow-Rate Decrease—Good | If operating beyond the optimal cyclone operating limits, decreasing the flow to the cyclone will result in improved separation. Physical responses include: lower cyclone operating pressure; cone angle at cyclone underflow resembling "ideal" shape; decreased cut-point | Lower variability to uniform vibration readings. Readings approaching baseline levels. | 30 Seconds |
| Flow-Rate Decrease—Bad | If operating at near optimal conditions, decreasing flow to the cyclone will result in reduced separation. Physical responses include: lower cyclone operating pressure; increased cone angle at cyclone underflow ("fanning"). | High variability vibration readings. Readings trending higher than baseline level at cyclone underflow. Readings trending lower than baseline level at cyclone overflow. | 30 Seconds |
| Cyclone Feed Density Increase (Good) | Required if feed is too dilute. Physical responses include: higher cyclone operating pressure; reduced cone-angle at cyclone underflow (approaching ideal shape); increased cut-point. | Lower variability to uniform vibration readings. Readings approaching baseline levels. | 30 Seconds |
| Cyclone Feed Density Increase (Bad) | Increase in cyclone feed density leading to hindered settling. Physical responses include: higher cyclone operating pressure; reduction in underflow discharge cone angle; increased cut-point, | High variability vibration readings. Readings trending lower than baseline level at cyclone underflow. Readings trending higher than baseline level at cyclone overflow. | 30 Seconds |
| Cyclone Feed Density Decrease (Good) | Decreased hindered settling. Physical responses include: lower cyclone operating pressure; increase in underflow discharge cone angle; reduced cut-point. | Lower variability to uniform vibration readings, and readings approaching baseline levels. | 30 Seconds |
| Cyclone Feed Density Decrease (Bad) | Excessive dilution. Physical responses include: excessively fine overflow; low overflow density; lower cyclone operating pressure; | High variability vibration readings. Readings trending above baseline readings at cyclone | 30 Seconds |

TABLE 1-continued

| Process Characteristics | Physical Response/Effects | Sensor Response | Lag Time |
|---|---|---|---|
| | increased discharge cone angle (fanning); reduced cut point, | underflow. Readings trending below baseline readings at cyclone overflow. | |

Figure 4A:
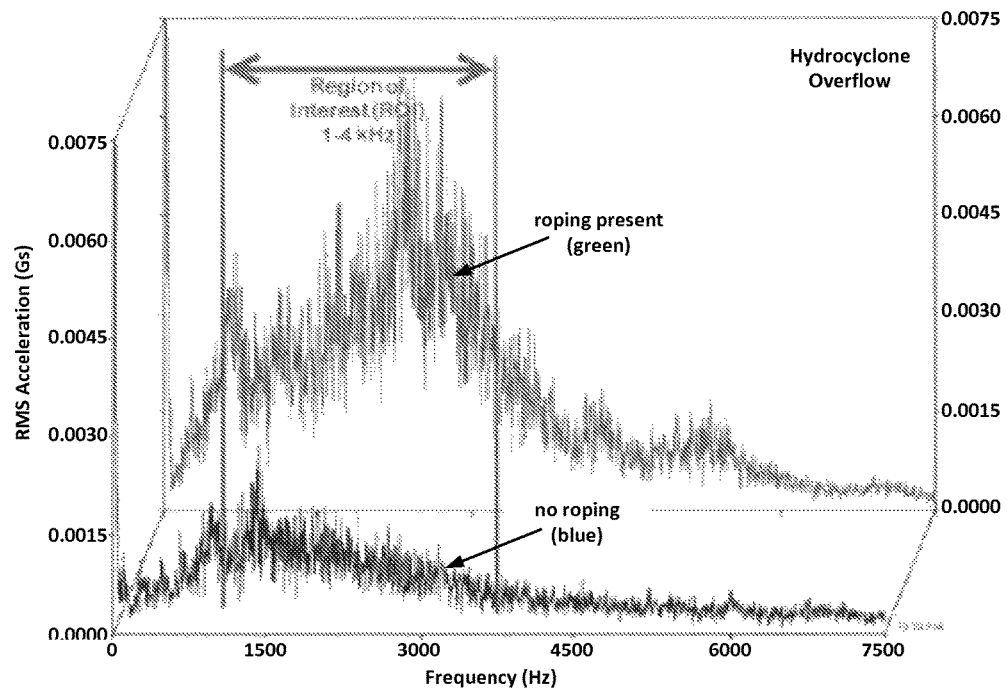
FIGS. 4A and 4B depict vibration spectra indicating the presence and absence of roping in the underflow of a hydrocyclone.

As shown in the band pass limited vibration spectrum of FIG. 4A, vibration energy in the 1 kHz to about 4 kHz region appears to be the primary energy band of consideration for overflow analysis. In this three-dimensional data plot, the upper (rear) data set exhibits higher energy levels in the 1-4 kHz range, which is indicative of the presence of roping. The lower (front) data set exhibits normal baseline energy levels associated with the absence of roping.

Figure 4B:
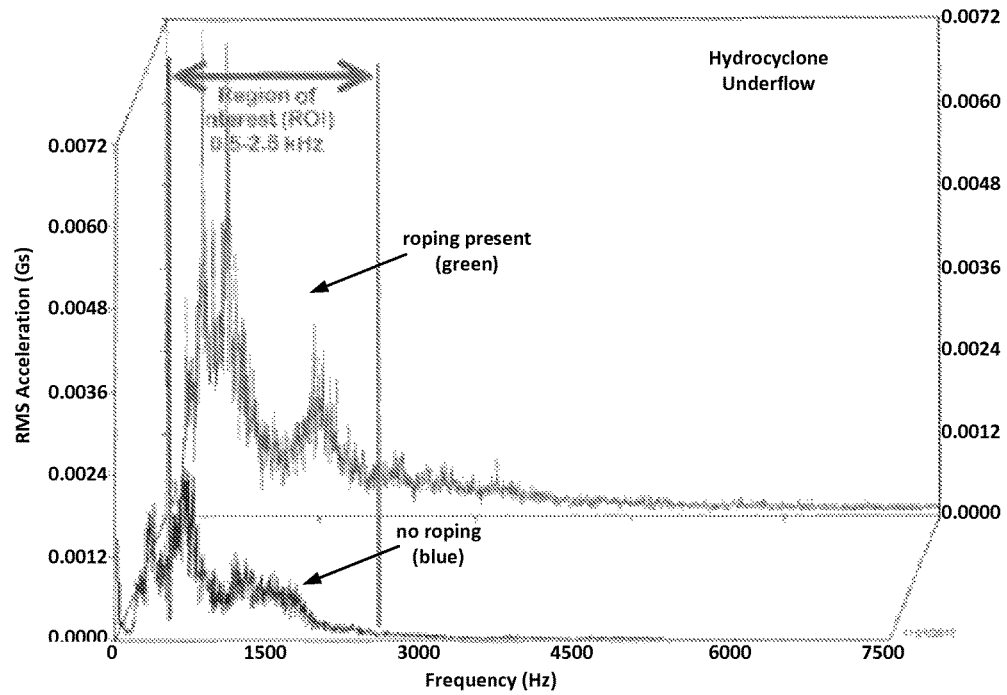

As shown in the band pass limited vibration spectrum of FIG. 4B, about 0.5 kHz to about 2.5 kHz appears to be primary region of interest for the underflow analysis. In this three-dimensional data plot, the upper (rear) data set exhibits higher energy levels in the 0.5-2.5 kHz range, which is indicative of the presence of roping. The lower (front) data set exhibits normal baseline energy levels associated with the absence of roping.

Figure 5A:
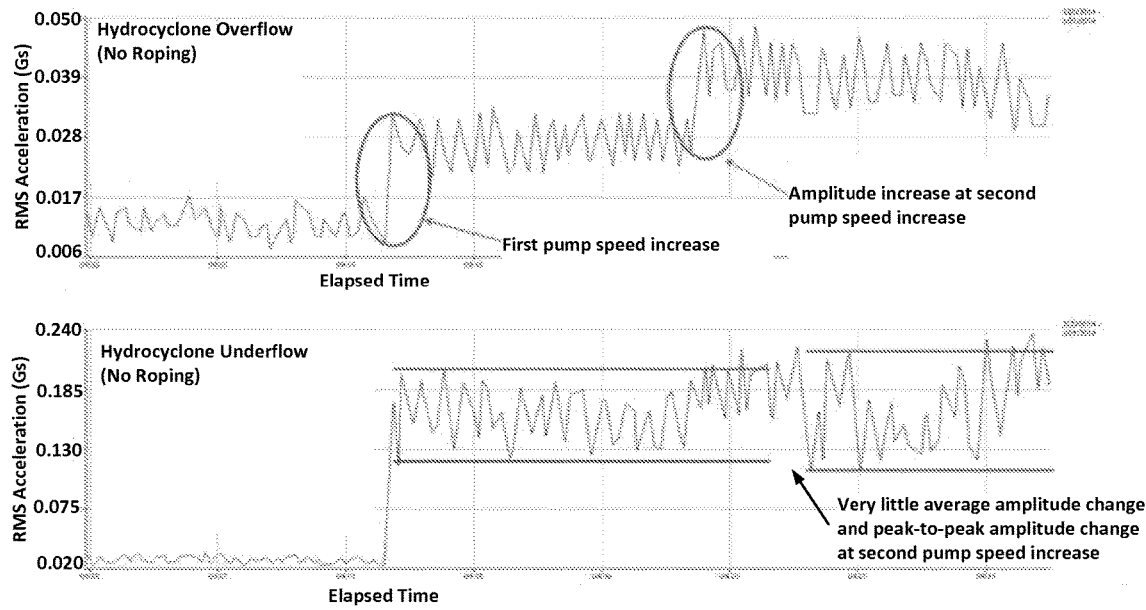

The upper portion of FIG. 5A depicts an example of overall vibration based on data collected near the overflow of a hydrocyclone, and the lower portion depicts an example of vibration data collected near the underflow of the same hydrocyclone. After a first pump speed increase, the average overflow vibration energy level increases to about 27 mg and the average underflow vibration energy level increases to about 160 mg. After a second pump speed increase, the average overflow vibration energy level increases to about 40 mg, and the average underflow level hardly increases at all, although the peak-to-peak underflow amplitude level is somewhat greater due to the fact the process changed slightly. The underflow vibration energy pattern of FIG. 5A after the second speed increase is indicative of a normally operating (non-roping) hydrocyclone.

Figure 5B:
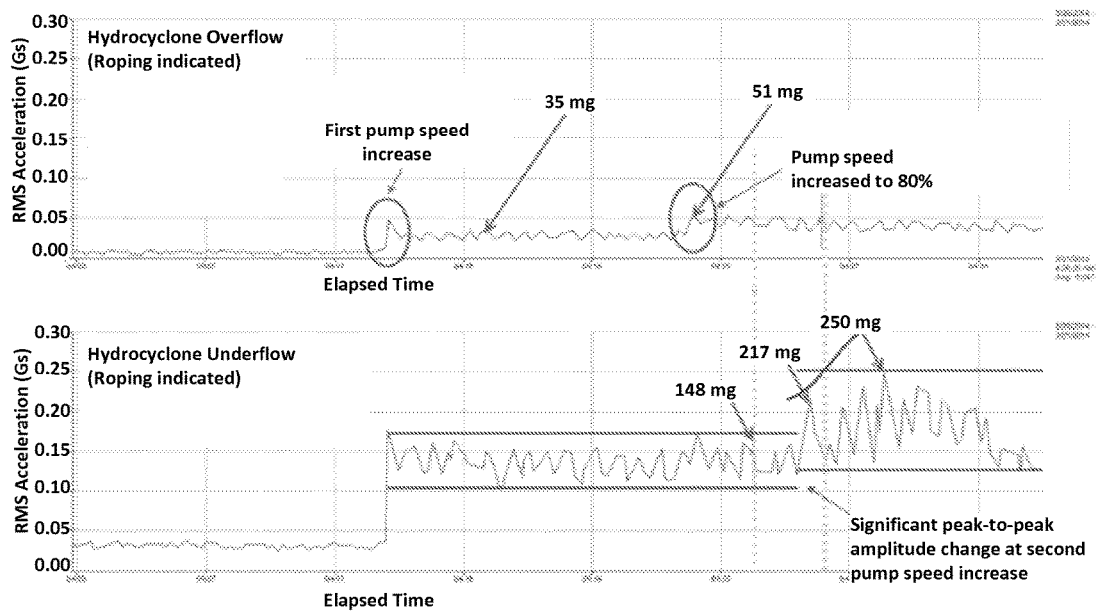

The upper portion of FIG. 5B depicts an example of overall vibration based on data collected near the overflow of a hydrocyclone, and the lower portion depicts an example of vibration data collected near the underflow of the same hydrocyclone. After the first pump speed increase, the average overflow vibration energy level increases to about 35 mg and the average underflow vibration energy level increases to about 148 mg. After the second pump speed increase, the overflow vibration energy level increases to about 51 mg and the underflow vibration energy level increases to about 217 mg. Note the significant peak-to-peak amplitude increase in the underflow vibration energy after the second pump speed increase. This is an indicator of roping in the hydrocyclone that began after the second speed increase. Based on the roping indication, the operator (or the DCS automatically) may open up one or more other available hydrocyclones in the pack to distribute flow so that the particular slurry is not as concentrated. Alternately, the operator (or the DCS automatically) may adjust the pump speed or adjust the density of the slurry going to the pack.

Figure 6A:
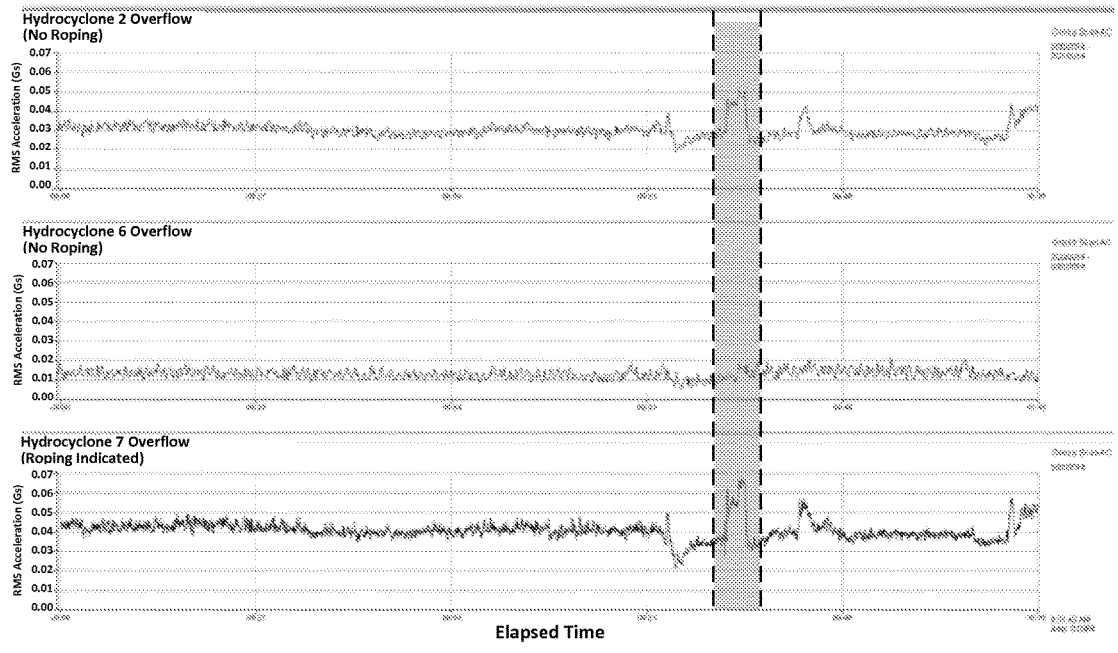
FIGS. 6A and 6B depict vibration waveforms indicating the presence and absence of roping in the underflow of a hydrocyclone.
Figure 6B:
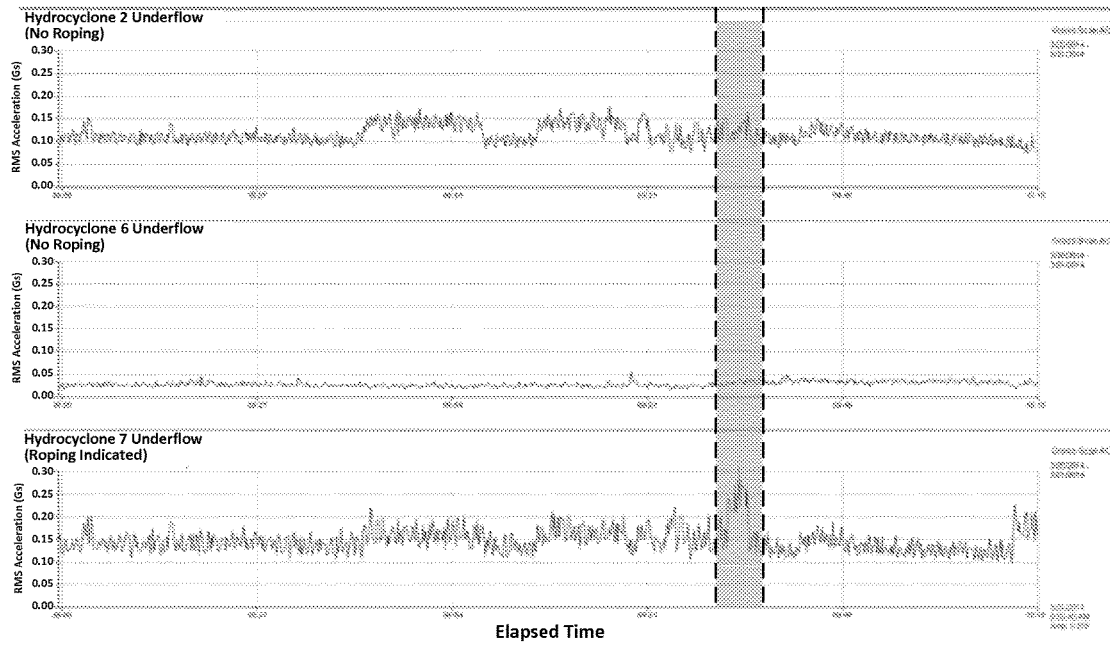

FIG. 6A depicts examples of overall vibration based on data collected near the overflows of three hydrocyclones in a pack. FIG. 6B depicts vibration data collected near the underflows of the same three hydrocyclones. The significant peak-to-peak amplitude fluctuations in the underflow and overflow vibration energy in the time range between the dashed lines are indicators of roping in hydrocyclone number 7. No roping is indicated in the data from hydrocyclone numbers 2 and 6. The increased vibration amplitude in the overflow of hydrocyclone number 2 is most likely due to condition changes in the flow rate. Generally, when one hydrocyclone experiences roping, other hydrocyclones can have changes in their flow rates.

FIGS. 7A-7F depict example plots of vibration data collected during a series of events related to the operation of six hydrocyclones in an eight hydrocyclone pack, one of which experiences a plugging event. In this example, the hydrocyclones (designated as 2-1 through 2-6) are controlled by a human operator rather than by control logic. The problematic hydrocyclone and the other hydrocyclones in the same pack are evaluated to differentiate the problematic hydrocyclone from the others. The plots depict vibration data collected from an overflow accelerometer (grey) and an underflow accelerometer (blue) on each hydrocyclone. The open or closed state of the hydrocyclone is depicted by the green trace. As expected, the plugging event has an impact on all the hydrocyclones within the pack.

Figures 7A, 7B, 7C, 7D, 7E, 7F:
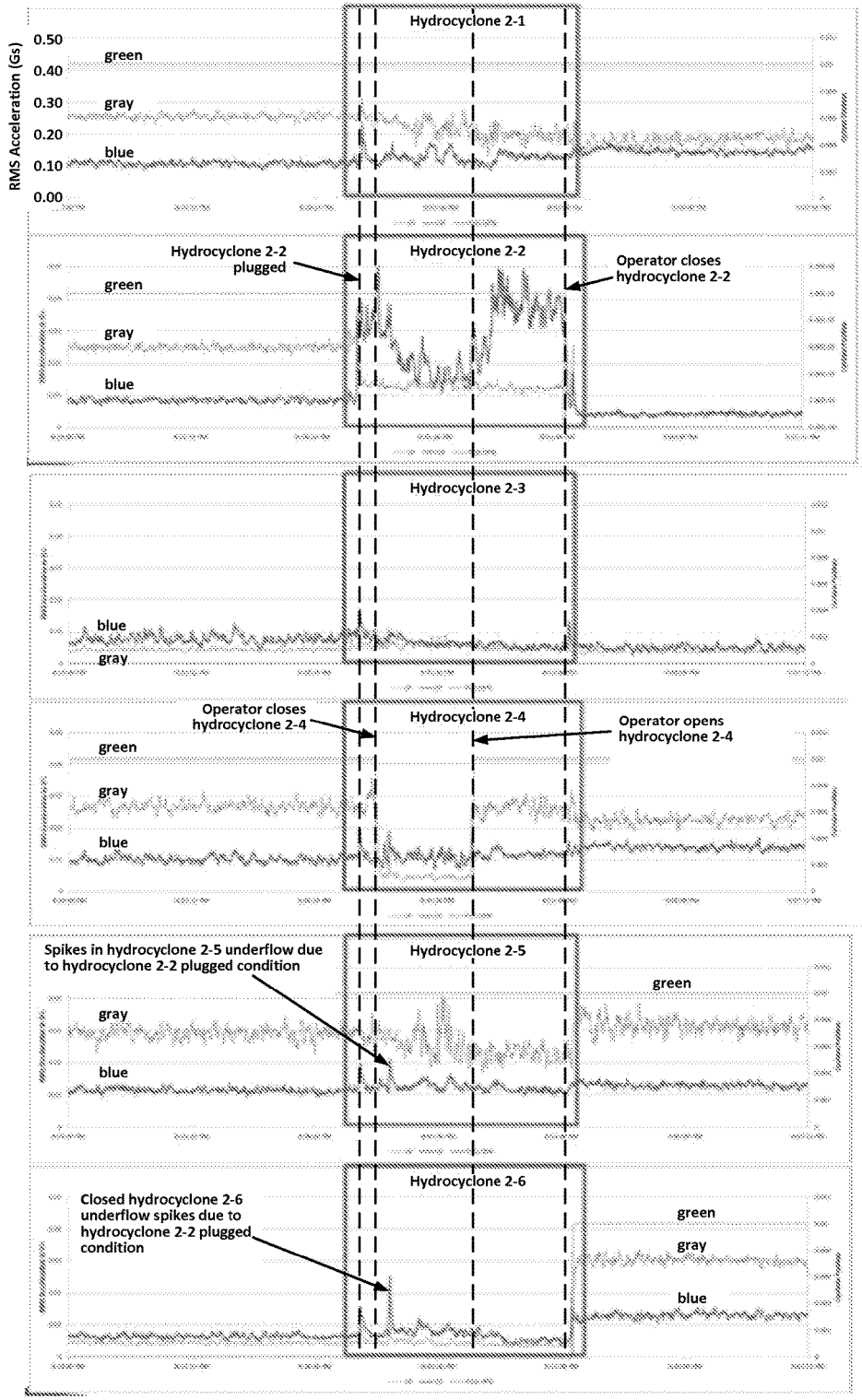
FIGS. 7A-7F depict vibration waveforms indicating the effects of plugging in a hydrocyclone.

FIG. 7B depicts overall vibration based on data collected for hydrocyclone 2-2, which show the vibration levels from the underflow and overflow accelerometers "invert" relative to the readings from the other cyclones. This indicates that hydrocyclone 2-2 is plugged. FIG. 7A and FIGS. 7C-7F show jumps in the vibration levels measured by the underflow sensors (blue) on all of the neighbouring hydrocyclones, although none of the others "invert." Based on the plugging indication, the operator (or the DCS automatically) may close the valve to the plugged hydrocyclone and open another hydrocyclone, if available. The plugged hydrocyclone would then need to be flushed or cleaned out. Generally, not all hydrocyclones in a pack are running at the same time. Therefore, extra hydrocyclones may be available to absorb the load generated when a problem occurs.

As indicated by FIG. 7D in this example, the operator mistakenly closed hydrocyclone 2-4 in response to the plugging condition of hydrocyclone 2-2. A few minutes later, the operator reopened hydrocyclone 2-4 and then closed hydrocyclone 2-2.

As indicated by FIGS. 7E and 7F, the underflow vibration levels of the normally operating hydrocyclone 2-5 and the closed hydrocyclone 2-6 are also affected by the plugged condition of hydrocyclone 2-2.

Figure 8A:
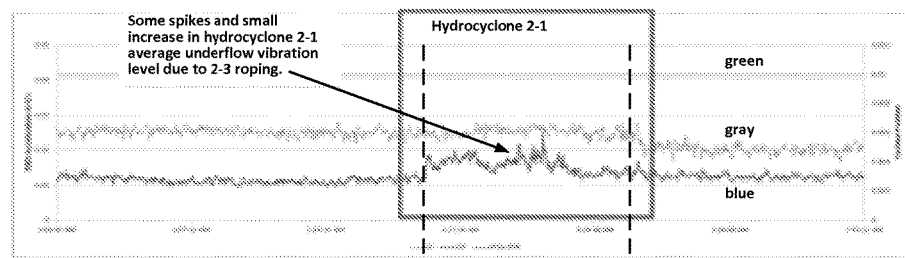
FIGS. 8A-8D depict vibration waveforms indicating the effects of roping in a hydrocyclone.
Figure 8B:
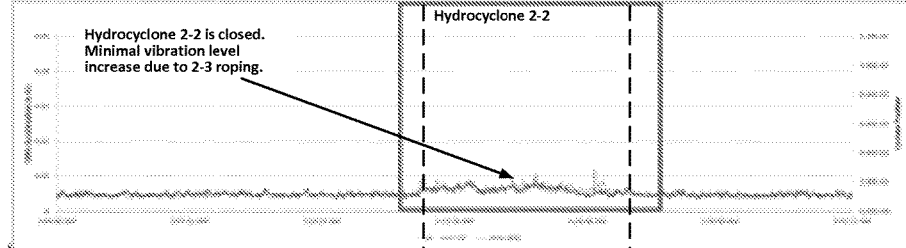
Figure 8C:
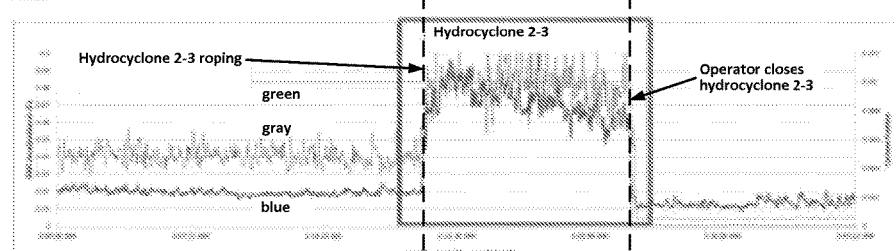
Figure 8D:
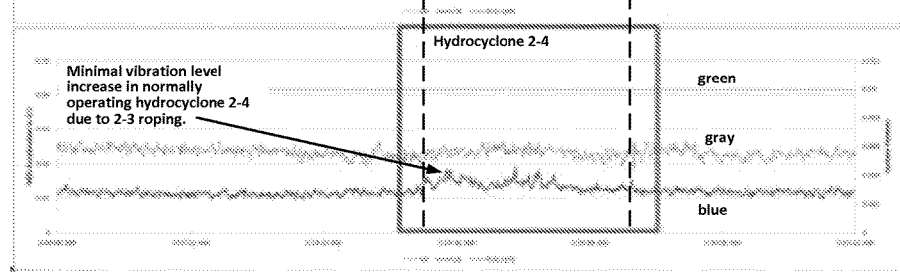

FIGS. 8A-8D depict example plots of vibration data collected during a series of events related to the operation of four hydrocyclones in a pack (2-1 through 2-4), one of which experiences a roping event. As with the previous example, the vibration levels of the problematic hydrocyclone and the other hydrocyclones in the pack are evaluated. This is another example in which the hydrocyclones were controlled by a human operator. As shown in FIG. 8C, the overflow and underflow vibration levels for hydrocyclone 2-3 increase dramatically and their levels converge, clearly indicating a roping event. Vibration levels of the other two open hydrocyclones (2-1 and 2-4) show the effects of the roping of unit 2-3, but those levels do not converge. An analysis of this data indicates conclusively that unit 2-3 is the problem unit in this example. Based on the roping indication, the operator (or the DCS automatically) may open up one or more other available hydrocyclones in the pack to distribute flow so that the particular slurry is not as concentrated. Alternately, the operator (or the DCS automatically) may adjust the pump speed or adjust the density of the slurry going to the pack.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A hydrocyclone vibration measurement system comprising:
   a set of upper vibration sensors comprising at least one vibration sensor attached to an overflow portion of each hydrocyclone in a hydrocyclone pack, the upper vibration sensors generating a plurality of analog overflow vibration signals;
   a set of lower vibration sensors comprising at least one vibration sensor attached to an underflow portion of each of the hydrocyclones in the hydrocyclone pack, the lower vibration sensors generating a plurality of analog underflow vibration signals; and
   a vibration analysis system including:
      an analog-to-digital converter for sampling the analog overflow vibration signals and underflow vibration signals at a fixed sampling rate and converting the analog overflow and underflow vibration signals into digital overflow and underflow vibration signals; and
      one or more overall vibration processing channels for processing the digital overflow and underflow vibration signals to generate overflow and underflow scalar vibration values representing overall vibration measured at the overflow and underflow portions of the hydrocyclones in the hydrocyclone pack,
      wherein the vibration analysis system interfaces with a distributed control system to provide control information to the distributed control system based at least in part on one or both of the overflow scalar vibration values and the underflow scalar vibration values,
      wherein the control information is used by the distributed control system to implement one or more control functions comprising:
         control of one or more valves to distribute flow to one or more available hydrocyclones in the hydrocyclone pack;
         adjustment of a speed of one or more pumps associated with the hydrocyclone pack; and
         adjustment of density of a slurry going to the hydrocyclone pack.

2. The system of claim 1 wherein the vibration analysis system includes one or more band pass filters for band pass filtering the digital overflow and underflow vibration signals to generate band pass limited digital overflow and underflow vibration signals.

3. The system of claim 1 wherein the upper vibration sensors are disposed such that a sensing axis of each upper vibration sensor is substantially perpendicular to a central flow axis of the hydrocyclone on which the sensor is mounted, and the lower vibration sensors are disposed such that a sensing axis of each lower vibration sensor is substantially perpendicular to the central flow axis of the hydrocyclone on which the sensor is mounted.

4. The system of claim 1 wherein the vibration analysis system includes a comparison module that compares one or more of
   the overflow scalar vibration values measured during a first time period to the underflow scalar vibration values measured during the first time period,
   the overflow scalar vibration values measured during the first time period to the overflow scalar vibration values measured during a second time period that is different from the first time period,
   the underflow scalar vibration values measured during the first time period to the underflow scalar vibration values measured during the second time period,
   the overflow scalar vibration values measured during the first time period to baseline overflow scalar vibration values measured during a time period when one or more of the hydrocyclones were operating in a normal condition, and
   the underflow scalar vibration values measured during the first time period to baseline underflow scalar vibration values measured during the time period when one or more of the hydrocyclones were operating in a normal condition,
based on which the comparison module generates control information that is used in implementing the one or more control functions.

5. The system of claim 4 wherein the comparison module compares the overflow scalar vibration values in a frequency range of 0 kHz to 4 kHz measured during the first time period to baseline overflow scalar vibration values in the frequency range of 0 kHz to 4 kHz measured during a time period when one or more of the hydrocyclones were operating in a normal condition.

6. The system of claim 4 wherein the comparison module generates control information for controlling operation of one or more of the hydrocyclones in the pack when energy levels of the overflow scalar vibration values in the frequency range of 0 kHz to 4 kHz measured during the first time period are higher than energy levels of the baseline overflow scalar vibration values in the frequency range of 0 kHz to 4 kHz measured during a time period when one or more of the hydrocyclones were operating in a normal condition.

7. The system of claim 6 wherein the control information comprises an alert message that informs an operator regarding a roping condition that may be occurring in underflow from one or more of the hydrocyclones.

8. The system of claim 6 wherein the control information comprises a control signal that initiates a shutdown of one or more of the hydrocyclones.

9. The system of claim 4 wherein the comparison module compares the underflow scalar vibration values in a frequency range of 0.5 kHz to 2.5 kHz measured during the first time period to baseline underflow scalar vibration values in the frequency range of 0.5 kHz to 2.5 kHz measured during a time period when one or more of the hydrocyclones were operating in a normal condition.

10. The system of claim 4 wherein the comparison module generates control information for controlling one or more of the hydrocyclones when energy levels of the underflow scalar vibration values in the frequency range of 0.5 kHz to 2.5 kHz measured during the first time period are higher than energy levels of the baseline underflow scalar vibration values in the frequency range of 0.5 kHz to 2.5 kHz measured during a time period when one or more of the hydrocyclones were operating in a normal condition.

11. The system of claim 10 wherein the control information comprises an alert message that informs an operator regarding a roping condition that may be occurring in underflow from one or more of the hydrocyclones.

12. The system of claim 10 wherein the control information comprises a control signal that initiates a shutdown of one or more of the hydrocyclones.

13. The system of claim 4 wherein the comparison module generates control information for controlling operation of one or more of the hydrocyclones when
    energy levels of the underflow scalar vibration values measured during the first time period are less than energy levels of the overflow scalar vibration values measured during the first time period, or
    energy levels of the underflow scalar vibration values measured during the second time period which occurs after the first time period are greater than energy levels of the overflow scalar vibration values measured during the second time period,
    wherein a transition of the energy levels of the underflow scalar vibration values from less than to greater than the energy levels of the overflow scalar vibration values indicates a plugged condition of one or more of the hydrocyclones.

14. The system of claim 13 wherein the comparison module generates an alert message that informs an operator regarding the plugged condition of one or more of the hydrocyclones.

15. The system of claim 13 wherein the control information comprises a control signal that initiates a shutdown of one or more of the hydrocyclones.

16. The system of claim 2 wherein the one or more band pass filters comprise:
    a first band pass filter for band pass filtering the digital overflow vibration signal in a first frequency range of 0 to 4000 Hz to generate the filtered digital overflow vibration signal; and
    a second band pass filter for band pass filtering the digital underflow vibration signal in a first frequency range of 500 to 2500 Hz to generate the filtered digital underflow vibration signal.

17. The system of claim 1 wherein the one or more overall vibration processing channels comprise:
    a first overall vibration processing channel for calculating the overflow scalar vibration values representing overall vibration measured at the overflow portions of the hydrocyclones in the hydrocyclone pack; and
    a second overall vibration processing channel for calculating the underflow scalar vibration values representing overall vibration measured at the underflow portions of the hydrocyclones in the hydrocyclone pack.

18. A method for measuring and analyzing vibration associated with a hydrocyclone, the method comprising:
    (a) sensing vibration associated with an overflow portion of the hydrocyclone using an upper vibration sensor attached to the overflow portion;
    (b) the upper vibration sensor generating an analog overflow vibration signal indicative of the vibration sensed in step (a);
    (c) sensing vibration associated with an underflow portion of the hydrocyclone using a lower vibration sensor attached to the underflow portion;
    (d) the lower vibration sensor generating an analog underflow vibration signal indicative of the vibration sensed in step (c);
    (e) sampling the analog overflow vibration signal and underflow vibration signal at a fixed sampling rate and converting the analog overflow and underflow vibration signals into digital overflow and underflow vibration signals;
    (f) band pass filtering the digital overflow and underflow vibration signals to generate band pass limited digital overflow and underflow vibration signals;
    (g) processing the digital overflow and underflow vibration signals to generate overflow and underflow scalar vibration values representing overall vibration measured at the overflow and underflow portions of the hydrocyclone, and
    (h) providing control information to a distributed control system based at least in part on the overflow and underflow scalar vibration values, wherein the control information may be used by the distributed control system to control one or more functions comprising:
        control of one or more valves to distribute flow to the hydrocyclone;
        adjustment of a speed of one or more pumps associated with the hydrocyclone; and
        adjustment of a density of a slurry going to the hydrocyclone.

19. The method of claim 18 further comprising:
    (i) comparing one or more of
    the overflow scalar vibration values measured during a first time period to the underflow scalar vibration values measured during the first time period,
    the overflow scalar vibration values measured during the first time period to the overflow scalar vibration values measured during a second time period that is different from the first time period,
    the underflow scalar vibration values measured during the first time period to the underflow scalar vibration values measured during the second time period,
    the overflow scalar vibration values measured during the first time period to baseline overflow scalar vibration values measured during a time period when hydrocyclone was operating in a normal condition, and
    the underflow scalar vibration values measured during the first time period to baseline underflow scalar vibration values measured during the time period when hydrocyclone was operating in a normal condition; and
    (j) based on the comparing of step (i), generating control information that may be used by the distributed control system to control the one or more functions.

20. The method of claim 19 wherein step comprises comparing the overflow scalar vibration values in a frequency range of 0 kHz to 4 kHz measured during the first time period to baseline overflow scalar vibration values in the frequency range of 0 kHz to 4 kHz measured during a time period when the hydrocyclone was operating in a normal condition.

21. The method of claim 19 wherein step (j) comprises generating control information for controlling operation of the hydrocyclone when energy levels of the overflow scalar vibration values in the frequency range of 0 kHz to 4 kHz measured during the first time period are higher than energy levels of the baseline overflow scalar vibration values in the frequency range of 0 kHz to 4 kHz measured during a time period when the hydrocyclone was operating in a normal condition.

22. The method of claim 19 wherein step (j) comprises generating an alert message that informs an operator regarding a roping condition that may be occurring in underflow from the hydrocyclone.

23. The method of claim 19 wherein step (j) comprises generating a control signal that initiates a shutdown of the hydrocyclone.

24. The method of claim 19 wherein step (i) comprises comparing the underflow scalar vibration values in a frequency range of 0.5 kHz to 2.5 kHz measured during the first time period to baseline underflow scalar vibration values in the frequency range of 0.5kHz to 2.5 kHz measured during a time period when the hydrocyclone was operating in a normal condition.

25. The method of claim 19 wherein step (j) comprises generating control information for controlling operation of the hydrocyclone when energy levels of the underflow scalar vibration values in the frequency range of 0.5 kHz to 2.5 kHz measured during the first time period are higher than energy levels of the baseline underflow scalar vibration values in the frequency range of 0.5 kHz to 2.5 kHz measured during a time period when the hydrocyclone was operating in a normal condition.

26. The method of claim 19 wherein step (j) comprises generating control information for controlling operation of the hydrocyclone when
  energy levels of the underflow scalar vibration values measured during the first time period are less than energy levels of the overflow scalar vibration values measured during the first time period, and
  energy levels of the underflow scalar vibration values measured during the second time period which occurs after the first time period are greater than energy levels of the overflow scalar vibration values measured during the second time period,
  wherein a transition of the energy levels of the underflow scalar vibration values from less than to greater than the energy levels of the overflow scalar vibration values indicates a plugged condition of the hydrocyclone.

27. The method of claim 26 wherein step (j) comprises generating the control information comprising an alert message that informs an operator regarding the plugged condition of the hydrocyclone.

28. The method of claim 26 wherein step (j) comprises generating the control information comprising a control signal that initiates a shutdown of the hydrocyclone.

29. A hydrocyclone vibration measurement system comprising:
  a set of upper vibration sensors comprising at least one vibration sensor attached to an overflow portion of each hydrocyclone in a hydrocyclone pack, the upper vibration sensors generating a plurality of analog overflow vibration signals;
  a set of lower vibration sensors comprising at least one vibration sensor attached to an underflow portion of each of the hydrocyclones in the hydrocyclone pack, the lower vibration sensors generating a plurality of analog underflow vibration signals;
  a vibration analysis system including:
    an analog-to-digital converter for sampling the analog overflow vibration signals and underflow vibration signals at a fixed sampling rate and converting the analog overflow and underflow vibration signals into digital overflow and underflow vibration signals;
    one or more overall vibration processing channels for processing the digital overflow and underflow vibration signals to generate overflow and underflow scalar vibration values representing overall vibration measured at the overflow and underflow portions of the hydrocyclones in the hydrocyclone pack, the one or more overall vibration processing channels including one or more band pass filters for band pass filtering the digital overflow and underflow vibration signals to generate band pass limited digital overflow and underflow vibration signals, and
    a comparison module that compares one or more of
      the overflow scalar vibration values measured during a first time period to the underflow scalar vibration values measured during the first time period,
      the overflow scalar vibration values measured during the first time period to the overflow scalar vibration values measured during a second time period that is different from the first time period,
      the underflow scalar vibration values measured during the first time period to the underflow scalar vibration values measured during the second time period,
      the overflow scalar vibration values measured during the first time period to baseline overflow scalar vibration values measured during a time period when one or more of the hydrocyclones were operating in a normal condition, and
      the underflow scalar vibration values measured during the first time period to baseline underflow scalar vibration values measured during the time period when one or more of the hydrocyclones were operating in a normal condition,
      based on which the comparison module generates control information that may be is used in implementing the one or more control functions,
  wherein the vibration analysis system interfaces with a distributed control system to provide the control information to the distributed control system;
  wherein the control functions comprising: control of one or more valves to distribute flow to one or more available hydrocyclones in the hydrocyclone pack;
  adjustment of a speed of one or more pumps associated with the hydrocyclone pack; and
  adjustment of density of a slurry going to the hydrocyclone pack.

* * * * *